May 11, 1965 L. F. BEACH 3,183,355
INFRARED ANTENNA ACTUATING DEVICE
Filed Sept. 27, 1951 3 Sheets-Sheet 1

INVENTOR
LENNOX F. BEACH
BY
ATTORNEY

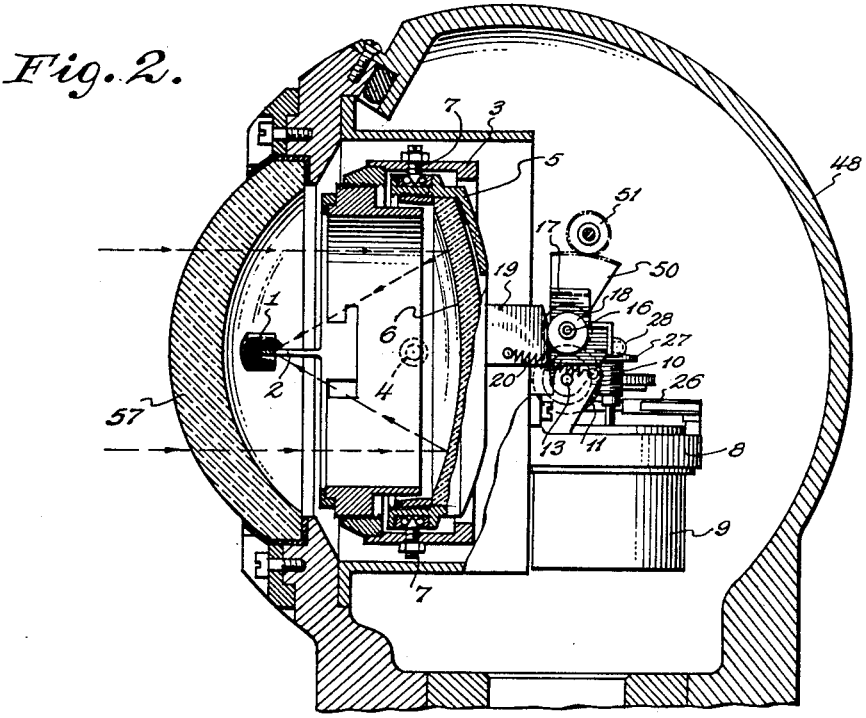
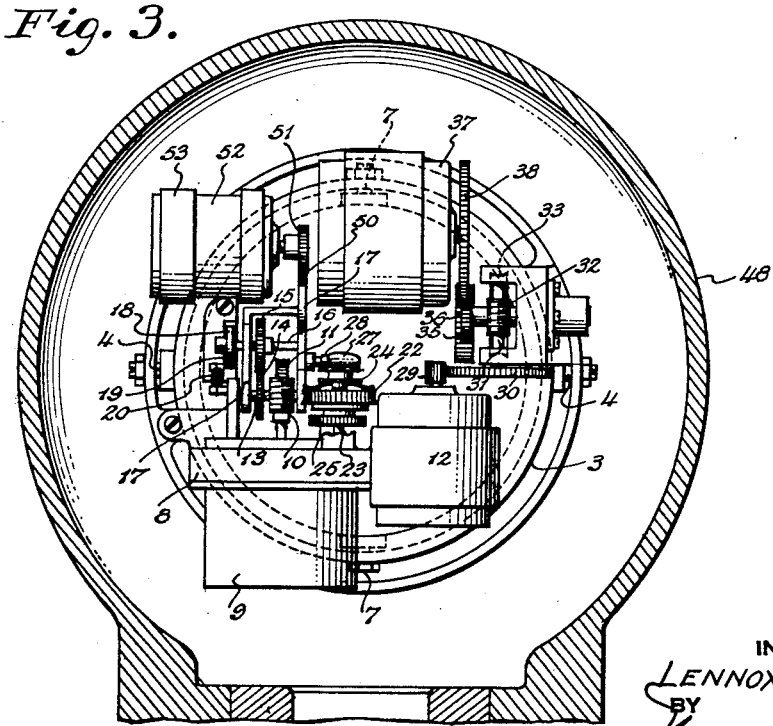

May 11, 1965  L. F. BEACH  3,183,355
INFRARED ANTENNA ACTUATING DEVICE
Filed Sept. 27, 1951  3 Sheets-Sheet 3

INVENTOR
LENNOX F. BEACH
BY
ATTORNEY

United States Patent Office 3,183,355
Patented May 11, 1965

3,183,355
INFRARED ANTENNA ACTUATING DEVICE
Lennox F. Beach, Sea Cliff, N.Y., assignor to Sperry Rand Corporation, a corporation of Delaware
Filed Sept. 27, 1951, Ser. No. 248,618
18 Claims. (Cl. 250—83.3)

This invention relates to antenna actuating apparatus. More particularly, the invention is concerned with a novel mechanism for imparting special movements to apparatus for the reception of infrared radiation.

Infrared radiant energy is electromagnetic energy that is detected and characterized by its heat transferring properties. If, for example, infrared radiation is focussed by a reflector upon a pickup or heat-sensitive element such as a thermopile, the radiant energy is converted into electrical energy and the resulting flow of thermoelectricity constitutes a useable signal.

One use of the signal has been in connection with the search for objects, all of which emit infrared radiations as a function of their temperature. Devices designed for this purpose have come to be known as passive bearing finders, since the presence and bearing of an object are determined solely from the reception of heat or infrared radiations from the object itself.

In searching for a radiating object, the passive bearing finder receives radiations from a background which may include water, sky, and clouds. To assist in distinguishing the object from its background, passive bearing finders have employed dual radiant energy pickups and an arrangement to focus the received radiation first on one portion of the pickup, then the other. If both portions are electrically connected in series opposition, an alternating current signal is generated having a frequency dependent on the speed with which the focussed radiation from the object under observation is swept across said portions. Yet, no signal output is produced when both portions of the sensing element are uniformly heated by steady background radiation.

In known passive bearing finders, infrared radiations are received by an antenna device that usually takes the form of a concave focussing element or reflector and a dual pickup at the focus located on the axis of symmetry of said reflector. The reflector is generally fixed relative to the pickup and both components are mounted in a housing capable of being rotated in azimuth or trained to scan the horizon. Where adapted for use aboard a sea-going vessel, the housing of the antenna is customarily stabilized to prevent the line of sight of the antenna from being directed alternately above and below the horizon as the vessel rolls and pitches. Thus, by rapidly rotating the housing in azimuth in the presence of an object on the horizon, radiation from the object is focussed first on one portion of the pickup, then the other, giving rise to the generation of an alternating current signal. However, this form of passive bearing finder is incapable of "locking on" to a target for the tracking thereof; and is suited solely for scanning or searching, since no provision is made for furnishing a sustained signal when the antenna is brought to a halt with the axis of symmetry of the reflector directed toward the target object. Moreover, in the known forms of passive bearing finders, the means employed to effect scanning and to stabilize the line of sight have been bulky and heavy, subtracting substantially from the utilization of the equipment where volume and weight are prime considerations.

The present invention provides an arrangement for tracking as well as for searching for a target. To this end a first oscillatory or "sector scan" movement is imparted to a reflector about a vertical axis of facilitate searching for target objects. Moreover, to focus target radiation first on one portion of a dual pickup element, then the other, a second oscillatory or "wobble" movement is simultaneously imparted to the reflector. The wobble oscillation occurs about the same axis, and is preferably of a higher frequency and a lower amplitude than the sector scan oscillation. Both oscillatory movements are derived from a single drive means, and provision is made for selectively halting the sector scan oscillation while continuing the wobble oscillation. Hence, with the antenna on target, a sustained signal output from the pickup element is obtainable, and the target's movements may be followed or tracked simply by training the periscope mounting the antenna.

Furthermore, means are provided for driving the reflector about a horizontal axis to stabilize the line of sight of the antenna against possible rolling and pitching disturbances. Thus, with the functions of stabilization, tracking and scanning being effected through the reflector, which is ordinarily much lighter and smaller than the antenna housing, substantial savings in weight and bulk are realizable over prior art devices in which the stabilizing and scanning functions were effected by moving the entire housing.

The principal object of my invention is to improve antenna actuating mechanisms.

Further objects are:

To bring about a plurality of oscillatory movements between a radiant energy focussing element and a radiant energy pickup element;

To effect a continuous wobble and scan motion of the focussing element of an infrared receiving apparatus;

To arrest the scan motion of a radiant energy focussing element at any desired position in the range of its scanning or oscillatory movement while maintaining continuous wobble motion;

To effect a continuous wobble and scan motion of the focussing element of an infrared antenna through use of a single drive means; and To stabilize the line of sight of an infrared antenna.

Other objects and structural details of the invention will be apparent from the following description when read in connection with the accompanying drawings, wherein FIG. 1 is a schematic view of the antenna actuating apparatus and its operating controls;

FIG. 2 is a side elevation, partly in section, of the antenna housing showing the mechanism for imparting special movements to the antenna;

FIG. 3 is a rear elevation, partly in section, of the antenna housing; and,

Figure 1:
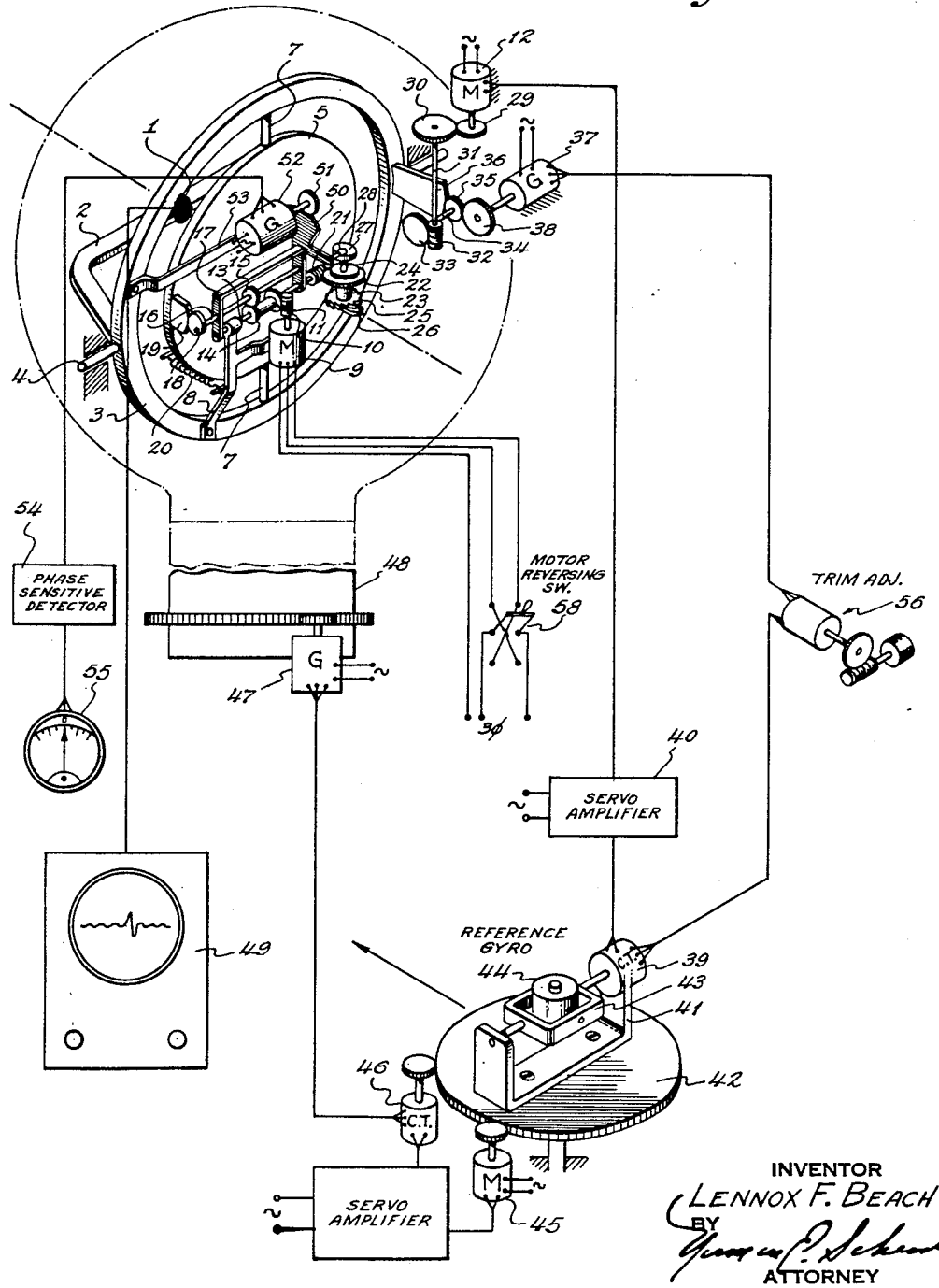
Figure 4:
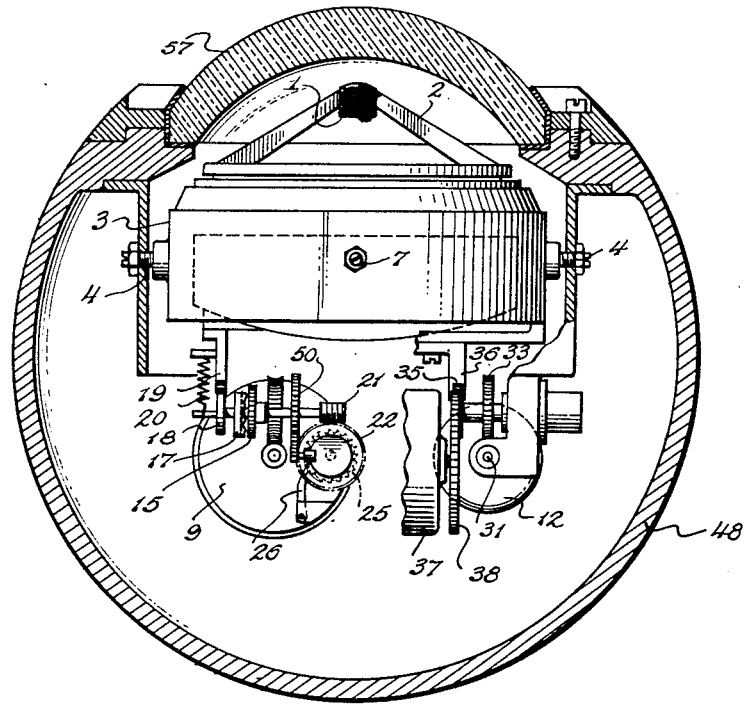
FIG. 4 is a top plan view, partly in section, of the antenna housing.

In the particular embodiment shown in the drawings, the invention is adapted for use on a submarine and the several elements of the antenna and its actuating apparatus are enclosed in a pressurized, watertight, globular shell 48 (FIG. 2) which comprises the antenna housing and has a window 57 to admit infrared radiations. The housing is mounted above the optical head of the periscope and is trained or rotated in azimuth therewith. The antenna includes a radiant energy pickup element 1 (FIGS. 1 and 2), sensitive to infrared radiation, such as a double-strip multi-element thermopile which is mounted on a bail 2 that is fixed on a gimbal 3 having trunnions 4 rotatable in suitable supports. Also supported by gimbal 3, by means of pivots 7, is a mount 5 which supports a focussing element 6 designed to focus incoming radiations on pickup 1. Focussing element 6 is a spherical reflector formed of glass and having an inner concave surface aluminized to a highly mirrored finish in accordance with standard optical practice. To obtain more efficient transmission of the far infrared frequencies into shell 48, window 57 may be made of silver chloride or any other suitable material in the form of a lens to correct for the spherical aberration of reflector 6. By this arrangement, the antenna or infrared line of sight may be moved in a vertical plane with reference to the periscope line of sight by rotation of gimbal 3 about its trunnions 4, and in a horizontal plane by rotation of mount 5 about pivots 7.

In order to oscillate or wobble the infrared line of sight horizontally relative to the periscope line of sight and pickup 1 for focussing target radiation first on one portion of the pickup then the other, a bracket 8 is fixed on gimbal 3 and supports a reversible, three phase motor 9 which rotates a worm 10 to drive a pinion 11 fixed on a shaft 13 rotatably supported by bracket 8. Also fixed to shaft 13 is a pinion 14 which drives a pinion 15 fixed on a shaft 16 which is rotatably mounted on a bail 17 pivoted on shaft 13. Fixed to the end of shaft 16 is an eccentric 18 which actuates a follower 19 fixed at the periphery of reflector mount 5 at a point midway between pivots 7. Suitable resilient means 20 are provided to maintain the follower in engagement with the eccentric. By this arrangement, the energization of motor 9 in either direction, by moving the double-pole, double-throw switch 58 to either of its closed positions, serves to wobble the infrared line of sight relative to the periscope line of sight and pickup 1. Although the amplitude and frequency of this wobbling motion is obviously a matter of choice, highly satisfactory results are obtained when the infrared line of sight is oscillated from the center of one thermopile strip to the center of the other at a frequency of approximately 5 cycles per second.

For sector scanning, another oscillation of the infrared line of sight is imparted in the horizontal plane on the wobble oscillations. This oscillation is also relative to the periscope line of sight and pickup element 1 since the shape of reflector 6, the width of sensing element 1, and the distance between the sensing element and the oscillatory axis of the reflector are so correlated as to permit the scanning of a sector of horizon several degrees in width without moving the reflector and sensing element as a unit.

In this connection, a worm 21 fixed on shaft 13 drives a pinion 22 rotatably mounted on shaft 23. A slip clutch having a disc 24 fixed to shaft 23 and frictionally engaging the upper surface of pinion 22 is employed so that rotatable movement of pinion 22 can be frictionally imparted to shaft 23 so long as shaft 23 is free to rotate. Rotation of shaft 23, however, is permitted in one direction only by a ratchet 25 fixed thereto and cooperating with a pawl 26. Fixed to the end of shaft 23 is a cam 27 which actuates a follower 28 fixed on a projection extending from bail 17. By this arrangement, when switch 58 is operated to energize motor 9 to drive in the direction which permits rotation of shaft 23, follower 28 rises and falls causing bail 17 to oscillate about its pivots on shaft 13. This oscillatory movement is imparted to reflector mount 5 through shaft 16, eccentric 18, and follower 19 to oscillate the infrared line of sight relative to pickup 1 so as to effect sector scan. Moreover, this oscillation is in addition to the wobble oscillations caused by the rotation of eccentric 18, and is a movement having a lower frequency and greater amplitude than the wobble oscillation. While it is evident that the choice of a particular frequency and amplitude fulfilling the foregoing requirements may be made as a matter of discretion, adequate results have been obtained by designing the sector scan components to provide a scan amplitude approximately three times that of the wobble amplitude, and a scan frequency approximately 1/120 that of the wobble frequency.

Upon operation of switch 58 to energize motor 9 to drive in the opposite direction, pawl 26 prevents ratchet 25 and, therefore, shaft 23 from rotating. Hence, the rotation of cam 27 is also prevented, and the sector scan oscillation derived therefrom is stopped. But, slippage of disc 24 against pinion 22 permits motor 9 to continue to drive eccentric 18 for wobble. Thus, depending on the position of switch 58, wobble and sector scan oscillations may be imparted simultaneously to reflector mount 5, or a wobble oscillation alone may be imparted thereto.

With switch 58 positioned for simultaneous wobble and sector scan, the antenna actuating apparatus functions in the search mode of operation. Suitable indicating means such as an oscilloscope 49 may be used to provide an indication of any signal output from pickup 1, and it is to be understood that such indicating means may take other forms including aural and recording types as well.

When, while searching, an indication of an object is received, the operator throws switch 58 to arrest or halt the relatively slow excursions of sector scan. The rapid wobble oscillations persist, however, and pickup 1 continuous to generate a signal voltage so long as the mean position of the antenna line of sight is substantially directed toward the object. To ascertain the bearing of the object relative to the position in azimuth of the antenna housing, a sector gear 50 extends upwardly from one end of bail 17 and meshes with a pinion 51 fixed to the rotor shaft of a synchro generator 52 supported on a bracket 53 fixed on gimbal 3. The rotor of generator 52 is excited from a suitable source of alternating current, and the stator is electrically connected to the input side of a conventional phase sensitive detector 54 whose output energizes a null-reading D.C. voltmeter 55. By this arrangement, the mean azimuthal position of reflector mount 5 relative to that of gimbal 3 is transmitted via generator 52 and detector 54 to voltmeter 55 which may be calibrated directly to indicate, from the polarity and magnitude of its reading, the direction and distance of departure of the antenna line of sight from the azimuthal position of the antenna housing.

Although in the embodiment shown, the focussing or reflecting element is oscillated relative to the pickup, it will be apparent to those skilled in the art that the same results may be obtained with but minor variations in the orientation of the components by oscillating the pickup relative to the focussing or reflecting element.

In order to stabilize the infrared line of sight in a vertical plane and thereby keep it aimed at the horizon or at a predetermined distance above or below the horizon, notwithstanding undulating movements of the vessel carrying the antenna, a reversible two-phase motor 12 drives a pinion 29 which meshes with a pinion 30 fixed on a shaft 31. Also fixed to shaft 31 is a worm 32 which drives a pinion 33 fixed to a shaft 34 to which is also fixed a pinion 35 which meshes with a sector gear 36 fixed to the periphery of gimbal 3 at a point midway between pivots 7. Thus, rotation of motor 12 in either direction causes rotation of the infrared line of sight about pivots 4 of gimbal 3.

To operate motor 12, a conventional follow-up servo loop is employed consisting of a synchro generator 37 whose rotor is excited from a suitable A.-C. source and is mechanically connected to motor 12 through pinion 35 meshing with a pinion 38 fixed on the generator shaft. The stator of generator 37 is electrically connected to the stator of a synchro control transformer 39 whose rotor signal is amplified by suitable power amplifying means 40 to drive motor 12. Transformer 39 is mounted on one leg of an upright U-shaped frame 41 whose base is bolted to a turntable 42 rotatable in azimuth by suitable gearing. The transformer is arranged so that its rotor shaft comprises one of the trunnions pivotally supporting the outer gimbal 43 of a vertical gyroscope 44 mounted between the legs of frame 41. Any movement of gimbal 43 relative to frame 41 and turntable 42 will rotate the rotor of transformer 39 and the signal therefrom will be amplified by amplifier 40 to drive motor 12 until the signal produced by generator 37 wipes out the signal input to amplifier 40. In this manner, reflector mount 5 and therefore the infrared line of sight is made to follow exactly the pivotal movements of gimbal 43.

The foregoing apparatus will stabilize the line of sight so long as the pivotal axis of gimbal 43 is maintained parallel with the pivotal axis of gimbal 3 defined by trunnions 4. To accomplish this another conventional follow-up servo loop is provided, and turntable 42 is driven through suitable gearing by a motor 45 operated by the suitably amplified error signal developed between a synchro control transformer 46 geared to turntable 42 and a synchro generator 47 geared to shell 48. By this arrangement, any rotation of shell 48 in azimuth will bring about an exact follow-up movement in azimuth of turntable 42, thereby maintaining the requisite parallelism between the pivotal axis of gimbal 43 and the pivotal axis of gimbal 3.

When a target is close aboard the submarine, it may subtend an arc in both bearing and elevation sufficiently large that signals will be received from only the hot spots of the target, or, if the target is uniform in temperature, from only the bow and stern. By elevating the line of sight of the antenna, more accurate bearings of the superstructure or stacks may be obtained and a rough estimate of the target height and shape may be made. Provision for elevating the line of sight is furnished by a trim adjustment element comprising suitable differential means such as a differential synchro 56 (FIG. 1) in the electrical connection between generator 37 and transformer 39. By displacing the rotor of synchro 56 from the stator thereof, the servo loop which includes motor 12 may, if desired, be caused to zero out with an angular displacement between the line of sight of the antenna and gimbal 43. Hence, the line of sight may be stabilized at a predetermined angle above the horizon. It will be apparent to those skilled in the art that the trim adjustment may be made just as readily to stabilize the line of sight at a predetermined angle below the horizon, and that the adjustment may be made also to accommodate the placing of the antenna at different heights above the level of the sea.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An actuating device for an antenna having a focussing element and a radiant energy pickup element, said device comprising means to oscillate one of said elements relative to the other element about a given axis through a given amplitude and at a given frequency, and a second means simultaneously to oscillate said one element relative to said other element about said given axis through a different amplitude and at a different frequency.

2. An actuating device for an antenna having a focussing element and a radiant energy pickup element, said device comprising means to oscillate the focussing element relative to the pickup element about an axis through a given amplitude and at a given frequency, and a second means simultaneously to oscillate the focussing element relative to the pickup element about said axis through a different amplitude and at a different frequency.

3. An actuating device for an antenna having a focussing element and a radiant energy pickup element, said device comprising means to impart a first oscillatory movement to the focussing element relative to the pickup element about an axis through a given angle and at a given frequency, a second means simultaneously to impart a second oscillatory movement to the focussing element relative to the pickup element about said axis through a different amplitude and at a different frequency, and means operable to halt the second oscillatory movement independently of the first oscillatory movement.

4. An actuating device for an antenna having a focussing element and a radiant energy pickup, said device comprising a reversible motor, means driven from the motor to impart a first oscillatory movement to the focussing element relative to the pickup element about an axis through a given angle and at a given frequency, a second means driven from the motor simultaneously to impart a second oscillatory movement to the focussing element relative to the pickup element about said axis through a different amplitude and at a different frequency, and means operable upon reversal of the motor to halt the second oscillatory movement independently of the first oscillatory movement.

5. An actuating device for an antenna having a focussing element and a radiant energy pickup element, said device comprising a gimbal supporting the focussing element for rotation about an axis of support, means depending from the gimbal to support the pickup element, a first cam to oscillate said focussing element about said axis independently of said gimbal, and, a second cam concomitantly to oscillate said focusing element about said axis independently of said gimbal through a different amplitude and at a different frequency.

6. An actuating device for an antenna having a focussing element and a radiant energy pickup element, said device comprising means to oscillate the focussing element relative to the pickup element about a first axis through a given amplitude and at a given frequency, a second means simultaneously to oscillate the focussing element relative to the pickup element about the first axis through a different amplitude and at a different frequency, and means to stabilize the focussing element about a second axis.

7. An actuating device for an antenna having a focussing element and a radiant energy pickup element, said device comprising a gimbal supporting the focussing element for rotation about a first axis, means to support the gimbal for rotation about a second axis perpendicular to the first axis, means depending from the gimbal to support the pickup element, a first cam to oscillate the focussing element about its axis of support, a second cam concomitantly to oscillate the focussing element about the same axis through a different amplitude and at a different frequency, and means operable to stabilize the focussing element about the second axis.

8. An actuating device for an antenna having a radiant energy pickup and a movable focussing element comprising means for oscillating the focussing element at one frequency and through one amplitude, a second means for oscillating the focussing element at a different frequency and through a different amplitude, reversible drive means for driving both oscillating means, one-way clutch means in the driving connection of one of the oscillating means, and means to reverse the drive means.

9. An actuating device for an antenna having a radiant energy pickup and a movable focussing element comprising means including an eccentric for oscillating the focussing element at one frequency and through one amplitude, means including a cam for oscillating the focussing element at a different frequency and through a different amplitude, reversible drive means for driving the eccentric and cam, one-way clutch means in the driving connection between the drive means and the cam, and means to reverse the drive means.

10. An actuating device for an antenna having a focussing element and a radiant energy pickup element, said device comprising a gimbal supporting the focussing element for rotation about an axis of support, means depending from the gimbal to support the pickup element, a first cam to oscillate said focussing element about said axis independently of said gimbal, a second cam concomitantly to oscillate said focussing element about said axis independently of said gimbal through a greater amplitude and at a lower frequency, driving means operable in one direction to actuate both of said cams and in the opposite direction to actuate the first cam independently, and means to reverse the direction of actuation of the driving means.

11. An actuating device for an antenna having a focussing element and a radiant energy pickup element, said device comprising a gimbal supporting the focussing element for rotation about an axis of support, means depending from the gimbal to support the pickup element, a first cam to oscillate said focussing element about said axis independently of said gimbal, a second cam concomitantly to oscillate said focussing element about said axis independently of said gimbal through a greater amplitude and at a lower frequency, driving means operable to actuate both of said cams in either direction, means to prevent the actuation of the second cam in one direction, and means to reverse the direction of rotation of the driving means.

12. An actuating device for an antenna having a focussing element and a radiant energy pickup element, said device comprising a gimbal supporting the focussing element for rotation about an axis of support, means depending from the gimbal to support the pickup element, a first cam to oscillate said focussing element about said axis independently of said gimbal, a second cam concomitantly to oscillate said focussing element about said axis independently of said gimbal through a greater amplitude and at a lower frequency, separate driving means to rotate each of said cams in either direction, a reversible motor to actuate both of said driving means, and means to limit the driving means of the second cam to unidirectional rotation.

13. An antenna for receiving infrared energy and adapted to be carried aboard a craft comprising a gimbal mounted for rotation about a horizontal axis, a reflector supported by the gimbal for rotation about a vertical axis, infrared pickup means supported by the gimbal and adapted to receive infrared radiation reflected from the reflector, driving means, and means actuated by the driving means to impart simultaneous wobble and sector scan movements to the reflector.

14. An infrared receiving device as claimed in claim 13 having means for arresting selectively the sector scan movement of the reflector at any desired position in the sector being scanned while maintaining a continuous wobble movement.

15. An infrared receiving device as claimed in claim 14, also having means for stabilizing the line of sight of the reflector.

16. An infrared receiving device as claimed in claim 15 wherein the gimbal mount is rotatable about a normally vertical axis and the means for stabilizing the line of sight of the reflector comprise a turntable also rotatable about a normally vertical axis, a vertical gyroscope mounted on the turntable, a first servo means responsive to displacement of the gyroscope relative to the turntable about its horizontal axis for positioning the reflector supporting gimbal about its horizontal axis in accordance with said displacement, and a second servo means to actuate the turntable to maintain the horizontal axis of the gyroscope parallel to the horizontal axis of the gimbal mount.

17. In an infrared receiving device as set forth in claim 13, the combination of means to derive a signal proportional to the sector scan movement imparted to the reflector.

18. In an infrared receiving device of the type described in claim 17 wherein the reflector and pickup means cooperate to form a line of sight to a target, the combination of means responsive to said signal for indicating the bearing of the line of sight.

References Cited by the Examiner
UNITED STATES PATENTS

| | | |
|---|---|---|
| 1,548,958 | 8/25 | Sperry. |
| 2,369,622 | 2/45 | Toulon _____ 250—83.3 |
| 2,437,275 | 3/48 | Skene et al. |
| 2,544,648 | 3/51 | Bergey et al. |

RALPH G. NILSON, *Primary Examiner.*